United States Patent [19]

Bibayan

[11] Patent Number: 5,572,648
[45] Date of Patent: Nov. 5, 1996

[54] SYSTEM FOR SIMULTANEOUSLY DISPLAYING A STATIC TOOL PALETTE HAVING PREDEFINED WINDOWING TOOL FUNCTIONS AND A DYNAMIC TOOL PALETTE WHICH CHANGES WINDOWING TOOL FUNCTONS IN ACCORDANCE WITH A CONTEXT OF AN EXECUTED APPLICATION PROGRAM

[75] Inventor: Farzad Bibayan, Irvine, Calif.

[73] Assignee: Canon Kabushiki Kaisha, Tokyo, Japan

[21] Appl. No.: 5,443

[22] Filed: Jan. 19, 1993

[51] Int. Cl.$^6$ ................................................. G06F 15/00
[52] U.S. Cl. ............................................................ 395/340
[58] Field of Search .................................. 395/145–150, 395/150–155, 157, 158, 160, 161

[56] References Cited

U.S. PATENT DOCUMENTS

| | | | |
|---|---|---|---|
| 4,428,065 | 1/1984 | Duvall et al. | 364/900 |
| 5,230,063 | 7/1993 | Hoeber et al. | 395/156 |
| 5,293,470 | 3/1994 | Birch et al. | 395/135 |
| 5,325,481 | 7/1994 | Hunt | 395/159 |

OTHER PUBLICATIONS

The X Window System, Scheifler and Gettys, ACM Transactions on Graphics, vol. 5, No. 2, Apr. 1986.
Rooney, "PageMaker gets a face–lift", PC Week, vol. 10, No. 1, p.37(2).
Landau, "Microsoft Works 3.0", MacUser, vol. 9, No. 1, p. 50(2).
Martinez, "Color It!", MacUser, vol. 8, No. 4, p. 83(2).
Said, "BeagleWorks joins the pack of Mac integrated programs", MacWEEK, vol. 6, No. 9, p. 1(2).
Parascandolo, "Charting a course", MacUser, vol. 6, No. 1, p. 162(10).

Primary Examiner—Heather R. Herndon
Assistant Examiner—Joseph R. Burwell
Attorney, Agent, or Firm—Fitzpatrick, Cella, Harper & Scinto

[57] ABSTRACT

Method and apparatus for changing a dynamic tool palette in accordance with a current context of an application includes providing a static display of windowing functions and a dynamic display of windowing functions wherein the dynamic display is altered in accordance with a current context of an application. In the invention, the application is executed and the context of the application is registered with a context memory. The registered context is examined and a determination is made as to the applicable windowing functions associated with the registered context. In accordance with the determination result, the dynamic display is modified.

16 Claims, 10 Drawing Sheets

EXAMPLES OF STATIC AND DYNAMIC TOOL PALETTES

EXAMPLE OF A DYNAMIC TOOL PALETTE

STATIC TOOLS

FIG.1 (PRIOR ART)

STATIC TOOLS

NEW BUTTONS
(DYNAMIC)

FIG.7  SCREEN 2

FIG. 8
SCREEN 3

SYSTEM FOR SIMULTANEOUSLY DISPLAYING A STATIC TOOL PALETTE HAVING PREDEFINED WINDOWING TOOL FUNCTIONS AND A DYNAMIC TOOL PALETTE WHICH CHANGES WINDOWING TOOL FUNCTONS IN ACCORDANCE WITH A CONTEXT OF AN EXECUTED APPLICATION PROGRAM

BACKGROUND OF THE INVENTION

1. Field of the Invention

The present invention relates generally to defining and displaying a tool palette by which execution of application programs in a windowing environment may be initiated. More specifically, the present invention relates to a method and apparatus for separating static and dynamic windowing functions (commonly referred to as "tool palettes") wherein the dynamic windowing function display is modified in accordance with a context environment of the currently operating application program.

2. Description of the Related Art

Window application products such as Microsoft Excel for Windows® are known as a software application for performing and processing tasks by jumping between user selected application programs (hereinafter "applet"). Each applet is an independent function, such as an input function or an output function, and collectively the applets permit the operator to perform a specific task.

There are at least two types of applets: a container-type applet or an editor-type applet. Container applets represent containers in which data or other containers are to be held. For example, a container applet such as a "file cabinet" is a type of container ordinarily at the top of the hierarchy of containers. A file cabinet contains folders, messages, and data objects, each of which is also a container. A container applet could also be a folder which may be a general folder or a mailbox folder. A container applet may also be a message wherein the message may be a facsimile message, phone message, modem message or an E-mail message. All of the above folders and messages may be contained in the file cabinet container.

On the other hand, editor applets create or manipulate data to be stored in a designated container such as a general folder or a facsimile message. Editor applets ordinarily do not permanently store data. For example, a message editor edits a message that is stored in a general folder or may request the message to be faxed.

In a windowing environment, each applet, whether it be a container or an editor, is represented in a display such as an icon display as a "tool" to perform a given function. A combination of the tools are commonly referred to as a "tool palette". Each applet, once selected, operates to open a window which is brought to the foreground of the display. The window may also be overlapped onto a previously opened window if the previous function has not been "closed out". However, only a window which is "in focus" is the currently operating window until it is closed or temporarily yields focus to another window.

The currently executing container applet determines the tool functions that are displayed in the tool palette. That is, the appearance of the tool palette is determined in accordance with the needs of a container applet. However, since the software application of tool palettes differ from one window to another, a user may be confused by a constantly changing tool palette display and therefore the user loses his/her point of reference for commonly used tools.

Figure 1:
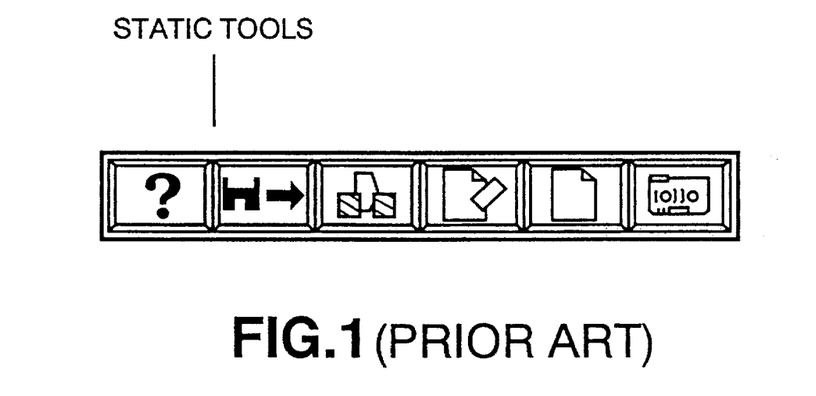
FIG. 1 is an illustration of a conventional static tool palette display.

Some window application products have tried to resolve the above-mentioned confusion by providing a static tool display as illustrated in FIG. 1. In a static tool display of FIG. 1, all tools remain displayed regardless of which applet is currently operating even though some of the tools are not operable or are completely unrelated to the presently operating applet. This solution, however, is also confusing since an operator may attempt to select a tool which is not selectable from that applet.

Figure 2:
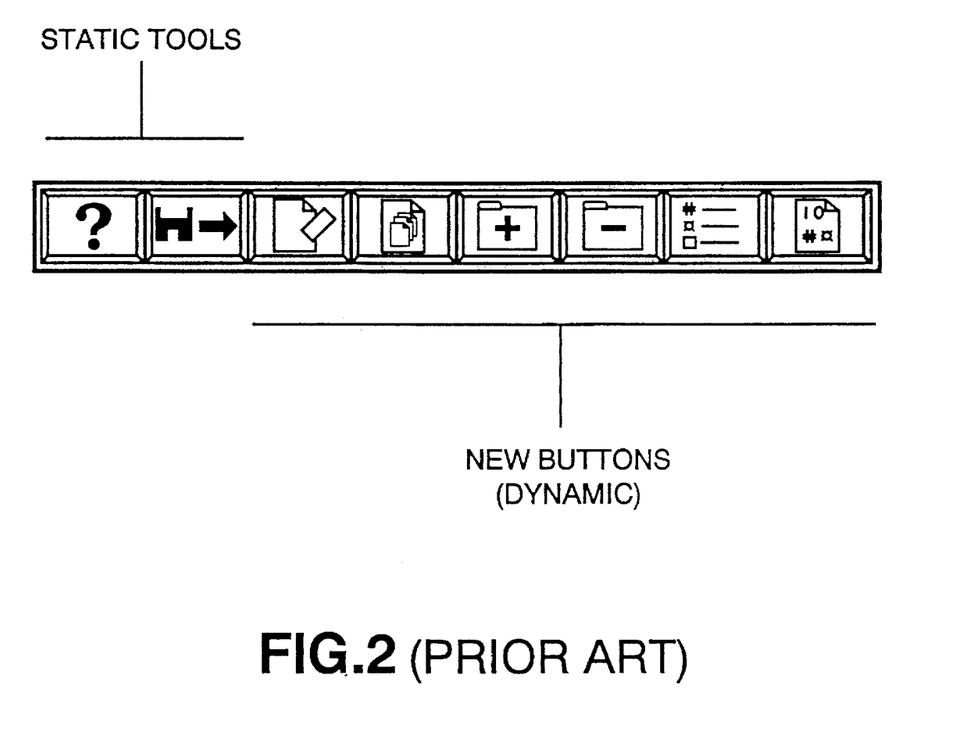
FIG. 2 is an illustration of a conventional dynamic tool palette display.

On the other hand, other window application products have tried to resolve this problem by having a dynamic tool palette display in which tools are added and subtracted as they become applicable to an applet. An example of a dynamic tool palette is shown in FIG. 2 in which tool functions are added or subtracted from the tool palette display as the tool functions become applicable to a specific applet. However, this solution is confusing also since commonly used tools are shifted around in the display, thus, confusing the user.

SUMMARY OF THE INVENTION

It is an object of the present invention to address the foregoing difficulties.

In one aspect, the invention provides a method for displaying tool palettes by which execution of first and second application programs may be initiated. More particularly, the method provides the steps for displaying a static tool palette, executing the first application program and displaying a first dynamic tool palette which is separate from the static tool palette and appropriate for the functionality of the first application program, and executing the second application program and displaying a second dynamic tool palette which is separate from the static tool palette and appropriate for the functionality of the second application program. The appearance and position of the static tool palette is the same regardless of whether the first or the second application program is executing.

According to another aspect of the invention, the invention provides a method for defining a context environment of an editor which is creating data for a designated container. More particularly, the method provides a first executing step for executing a first applet and storing a context environment indicative of the first applet. A second executing step executes a second applet whereby the second applet operates to examine the stored context environment indicative of the first applet and the second applet modifies its execution in accordance with the result of the examination step.

According to another aspect of the invention, there is provided a method for designating a window integrated application program context environment by executing a first integrated application program and storing a context environment corresponding to the first integrated application program, and executing a second integrated application program. The operation of the second integrated application program is modified in accordance with the context environment of the first integrated application program, and the context environment of the first integrated application program is maintained throughout the operation of the second integrated application program.

According to another aspect of the present invention, an apparatus for defining a context environment of a second applet which is processing data in conjunction with a first applet comprises a memory for storing a plurality of applets, a selector for selecting at least a first applet and a second applet from the plurality of applets, and a processor for 1) executing the first applet, 2) storing a context environment indicative of the first selected applet, 3) executing the second selected applet, 4) examining the stored context environment indicative of the first applet, and 5) modifying the execution of the second applet in accordance with the result of the examination.

In a further aspect of the invention, an apparatus designates a context environment for a window integrated application program. According to this aspect, a memory stores integrated application programs, a selector selects at least a first integrated application program and a second integrated application program from memory, whereby a processor executes the first integrated application program and stores a context environment corresponding to the first integrated application program. The processor executes the second selected integrated application program, modifies operation of the second selected integrated application program in accordance with the context environment of the first selected integrated application program, and maintains the context environment of the first selected integrated application program until the second selected integrated application program has completed its function.

DETAILED DESCRIPTION OF THE PREFERRED EMBODIMENT

The present invention can be used in a system having multimedia message handling capabilities as well as multimedia message processing capabilities for sending and receiving messages over many different medias. Such a system is described in U.S. application Ser. No. 07/808,757 filed Dec. 17, 1991, "Method And Apparatus For Sending And Receiving Multimedia Messages", the contents of which are incorporated by reference as if set forth in full herein. The present invention is implemented for controlling the operation of many different applets which are divided into container applets and editor applets such as the system illustrated in FIG. 3. In this system, the editor applets operate either as a hardware functions such as scanner functions or to control software functions such as a spell check editor in order to create or manipulate data. Container applets operate to create storage for data which contains the created message to be sent via one or more media types.

Figure 3:
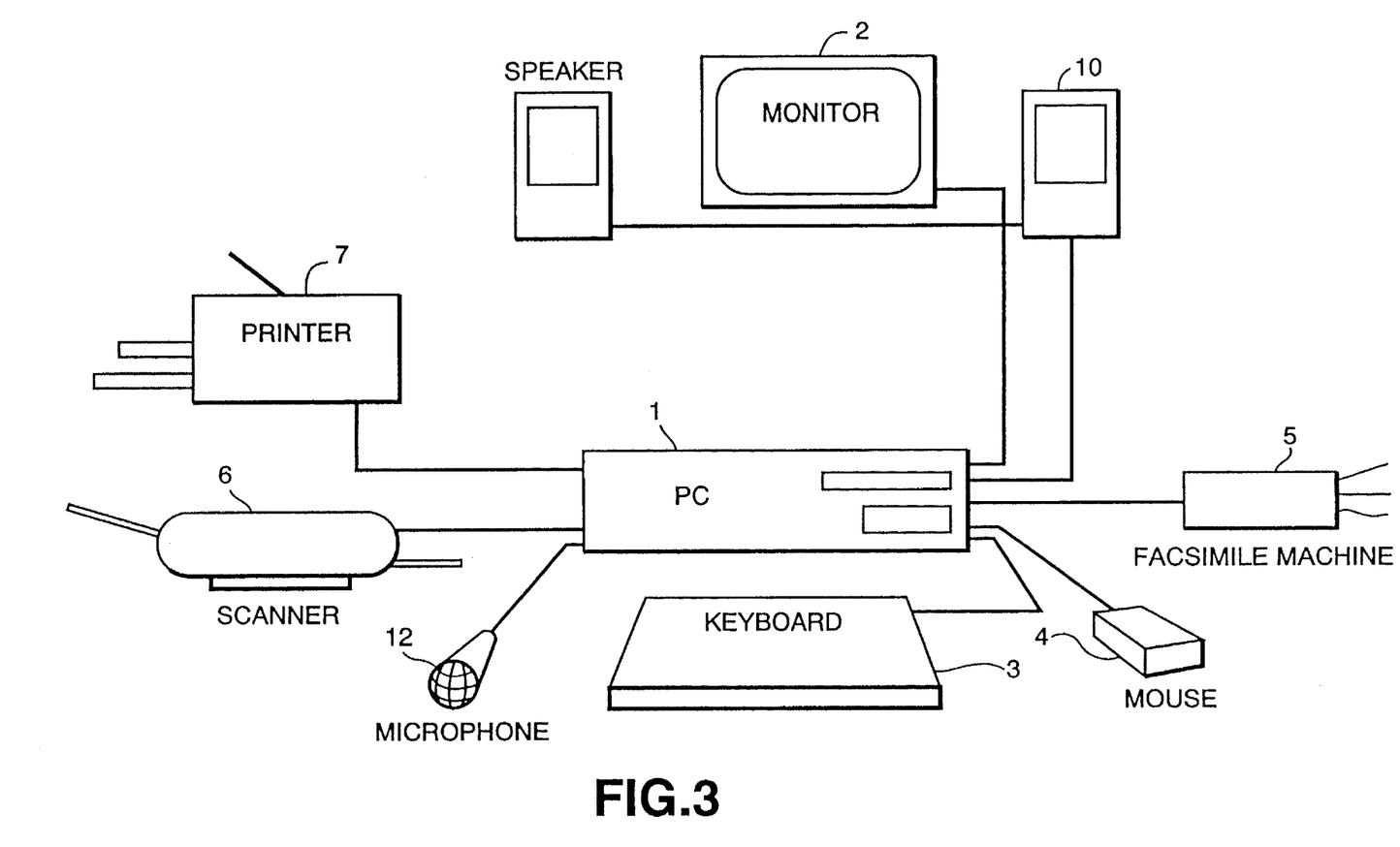
FIG. 3 is a diagram showing a system implementing the present invention.

As shown in FIG. 3, there is a personal computer 1 which is connected to monitor 2, keyboard 3, and mouse 4. Personal computer (PC) 1 is coupled to facsimile machine 5, scanner 6, and printer 7 by which it can receive/send messages on many different media. Also coupled to PC 1 is voice synthesizer 10, microphone 12, and telephone 13 (not shown). In the above configuration, PC 1 has the capability of handling messages of different media such as optical character recognition (OCR), text-to-speech, and E-mail. PC 1 has the ability to access each type of media through the above-mentioned applets. By accessing different applets, PC 1 can create messages and receive messages.

Figure 4:
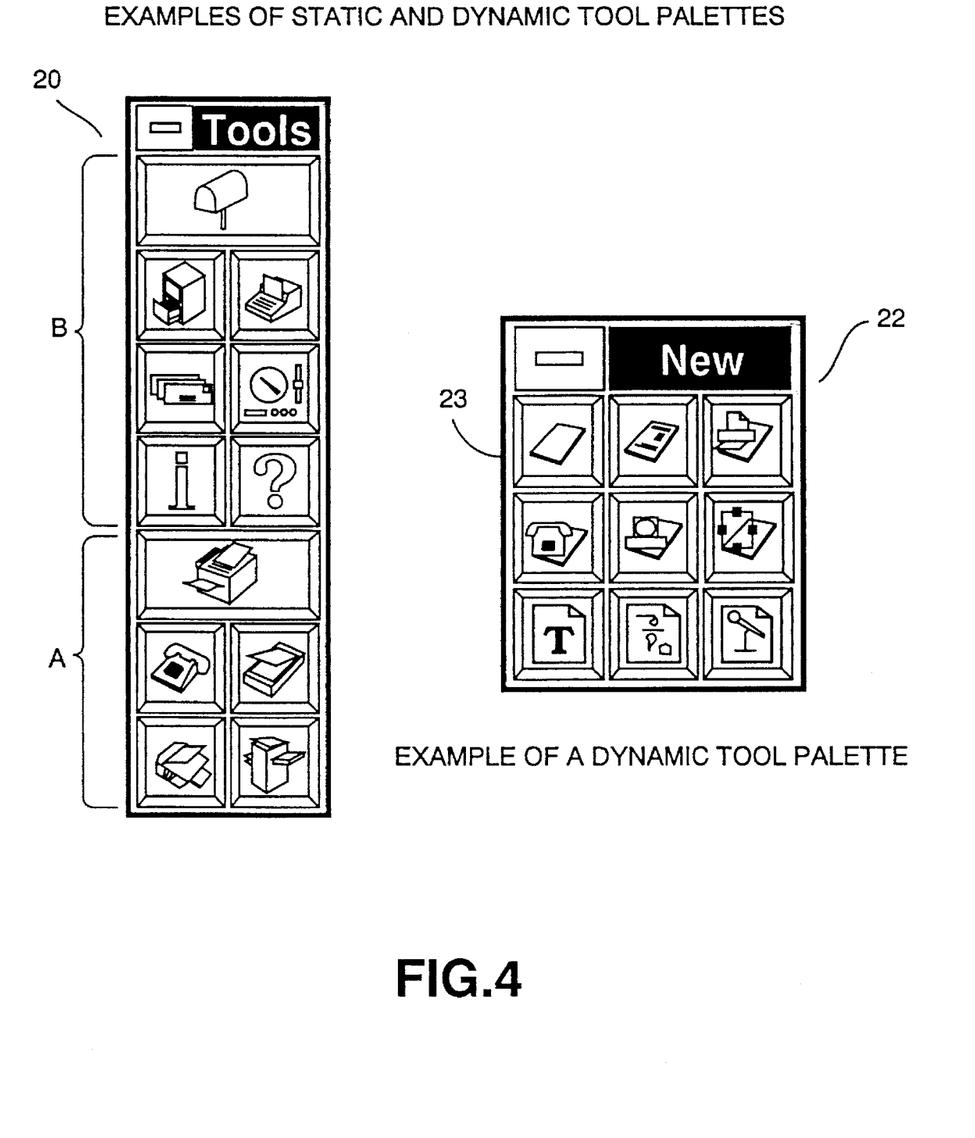
FIG. 4 is an exemplary view of the static and dynamic tool palette of the present invention.

Upon initial operation of the window application, a default context formats static tool display 20 and dynamic tool palette display 22 as illustrated in FIG. 4 onto monitor 2. The default display occurs at initial operation because a context environment has not been defined by the program. In this state, the window application displays a number of object functions or tools which correspond to the available hardware function such as scanner 6, printer 7, and facsimile 5 as illustrated at 20A of FIG. 4. In addition to the hardware functions, there are also illustrated in static tool palette display 20 software functions at 20B, such as file cabinet, mail, help, and message log.

In FIG. 4, static tool palette display 20 resides in the upper left-hand corner of the screen and does not change its location or appearance throughout the entire operation of the window application (unless the user explicitly moves the static tool palette). In addition, static tool palette display 20 continuously displays the same tools regardless of the context. The displayed tools are always operative regardless of the context, and thus all tool buttons are always active and the operator can select any one of them at any time. In this fashion, the user can readily locate and initiate commonly used functions.

Dynamic tool palette display 22, on the other hand, is a separate display which resides to the right of the static tool display 20. In addition, dynamic tool palette display 22 alters its size, shape, and contents in accordance with the context of the currently operating applet. For example, in the case the user selects folder icon 23, a new folder window is called to the foreground and its context is registered. Dynamic tool palette applet 24 displays the applicable tools for that container. Preferably, the tools in the dynamic tool palette are always active and the operator can select any one of them to initiate the corresponding functions.

In operation, upon selecting the folder applet, the applet for that function is downloaded from a file server and stored in a random access memory (RAM) from where it can be executed. After the folder applet is downloaded from the file server, its context which includes a program handle and database identification number is registered with a context manager applet 21. In the present invention, context manager 21 resides as part of the static tool palette display applet 20. However, context manager 21 may also be a separate applet which operates throughout the present program.

In accordance with the stored context, dynamic tool palette applet 24 examines the registered context. Based on the examination result, the dynamic tool palette display applet determines whether to modify its tool display. After determining the required tool functions based on the context, display 22 is modified and displayed with those tool functions which apply to the currently running folder applet.

Once the applicable tool palettes are displayed, the user may select an editor function for producing data to input into the open folder. In the present invention, the static tool palette display 20 is separate from dynamic tool palette display 20 and remains displayed on the screen regardless of the currently operating applet. In addition, static tool palette displays 20 always maintains the same tool selections. On the other hand, the dynamic tool palette display 22 is modified in accordance with the context of the currently operating applet.

Figure 5:
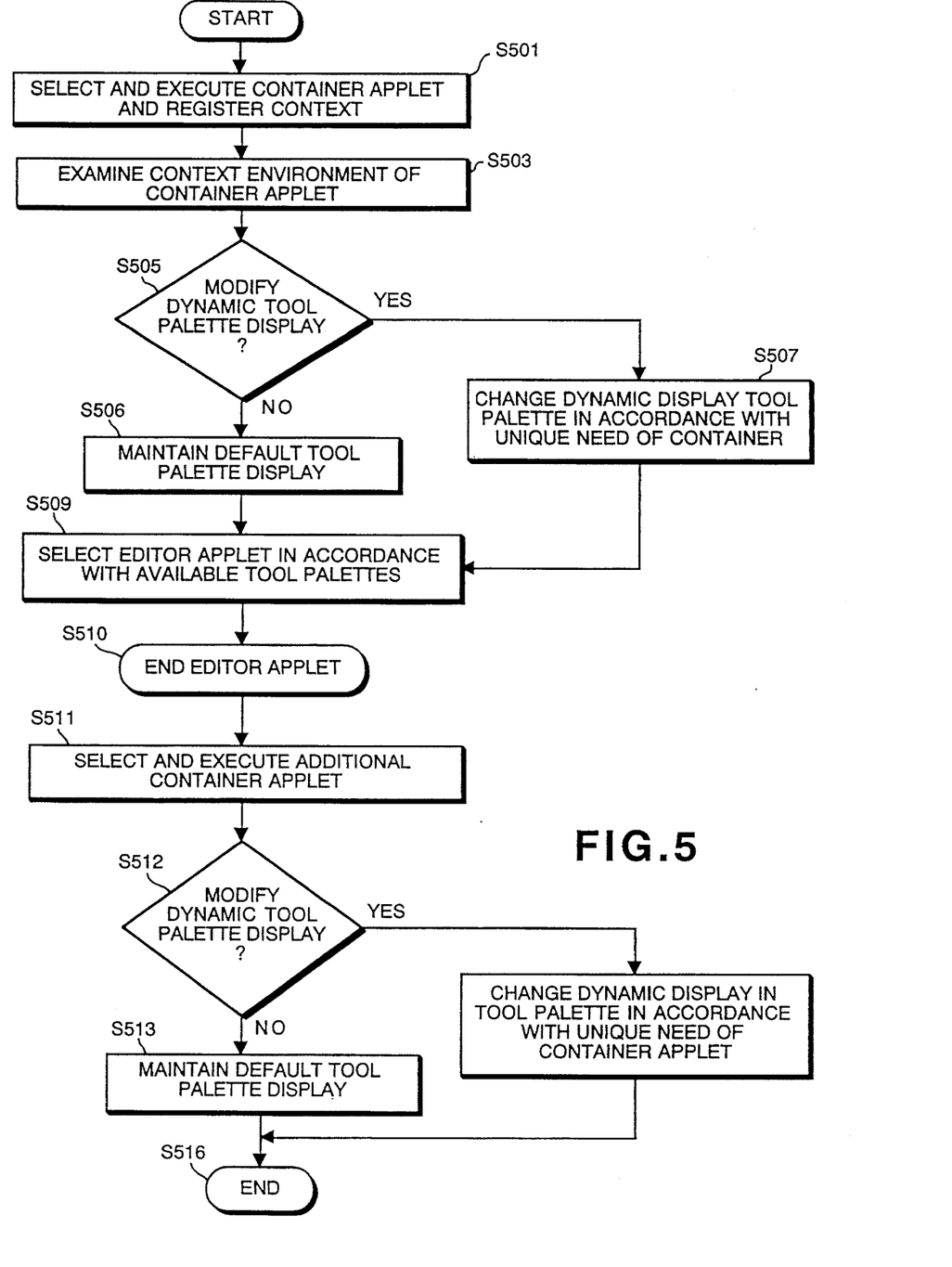
FIG. 5 is a flowchart explaining how the dynamic tool palette display is modified by a context.

A more detailed discussion of the method of modifying and displaying the dynamic tool palette 22 will be provided below with reference to the flowchart illustrated in FIG. 5.

Upon selecting and executing a container applet in step S501, the context environment of the container applet is registered with context manager 21. At step S503, dynamic tool palette display applet 24 examines the stored context. In step S505, dynamic tool palette display applet 24 determines if the current database identification is valid and determines whether to modify its dynamic tool palette display based on the current context. In the case that the display is not to be modified in step S506, the dynamic tool palette applet maintains a default tool palette display. However, in step S507, if it is determined that the dynamic tool palette display database is to be modified, dynamic tool palette display applet 24 determines the required tools to display in accordance with the context.

After the new tool palette has been displayed or the default tool palette has been maintained, an editor function can be selected from among the available tool functions.

In step S510, the editor application has completed its function and stored the created data in the database designated by the stored database identification. In step S511, a second container applet is open at which point dynamic tool palette display applet 24 examines and determines whether to modify the tool palette display.

If it is determined that the context does not require modification, for example, in the case of a folder, all tool functions are applicable, then a default display will be maintained in step S513. However, if it is determined that the context of a container requires less than all of the tools or that some tools are not relevant, for example, in the case of a voice message, the image editor function is not required, then in step S515 the dynamic tool palette display database is modified thereby modifying the dynamic tool palette display 22.

At this point, steps S501–S515 can be repeated for as many functions necessary to complete a task. Once a task has been completed and all applets have been terminated, dynamic tool palette display applet 24 can be terminated in step S516.

Figure 6:
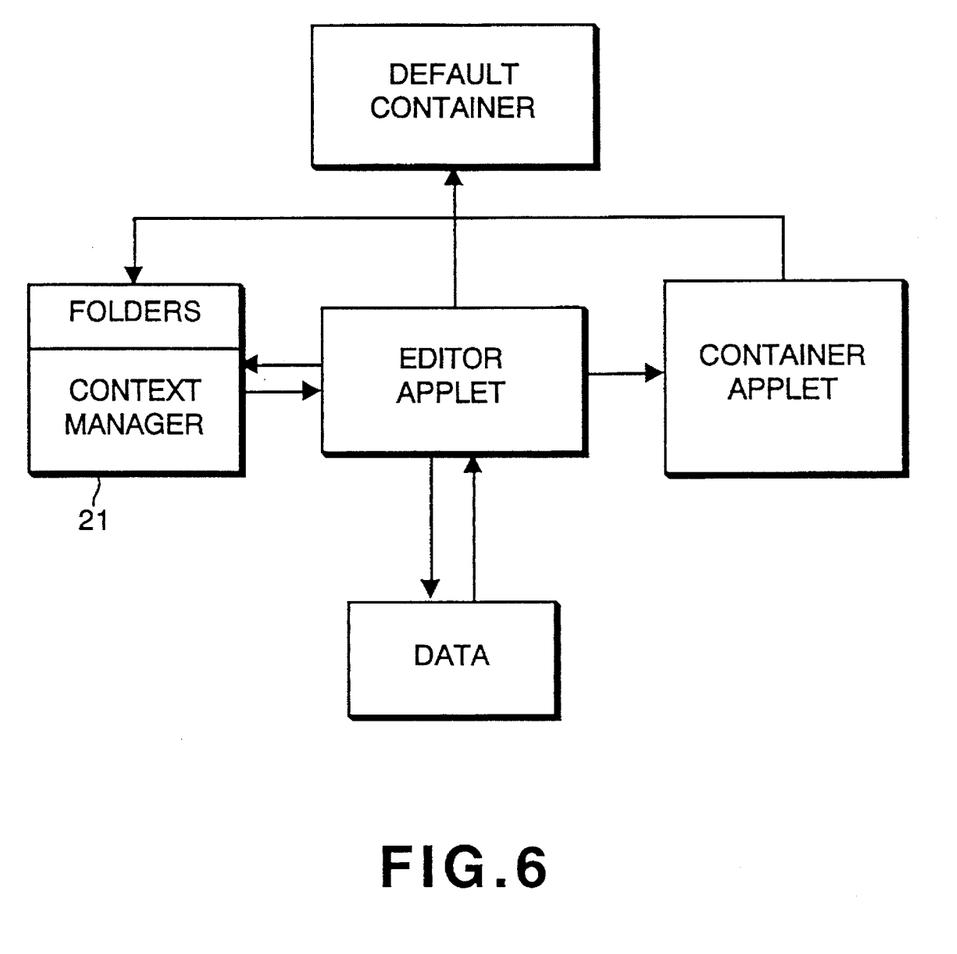
FIG. 6 is a block diagram illustrating how context is registered in the context manager.
Figure 6A:
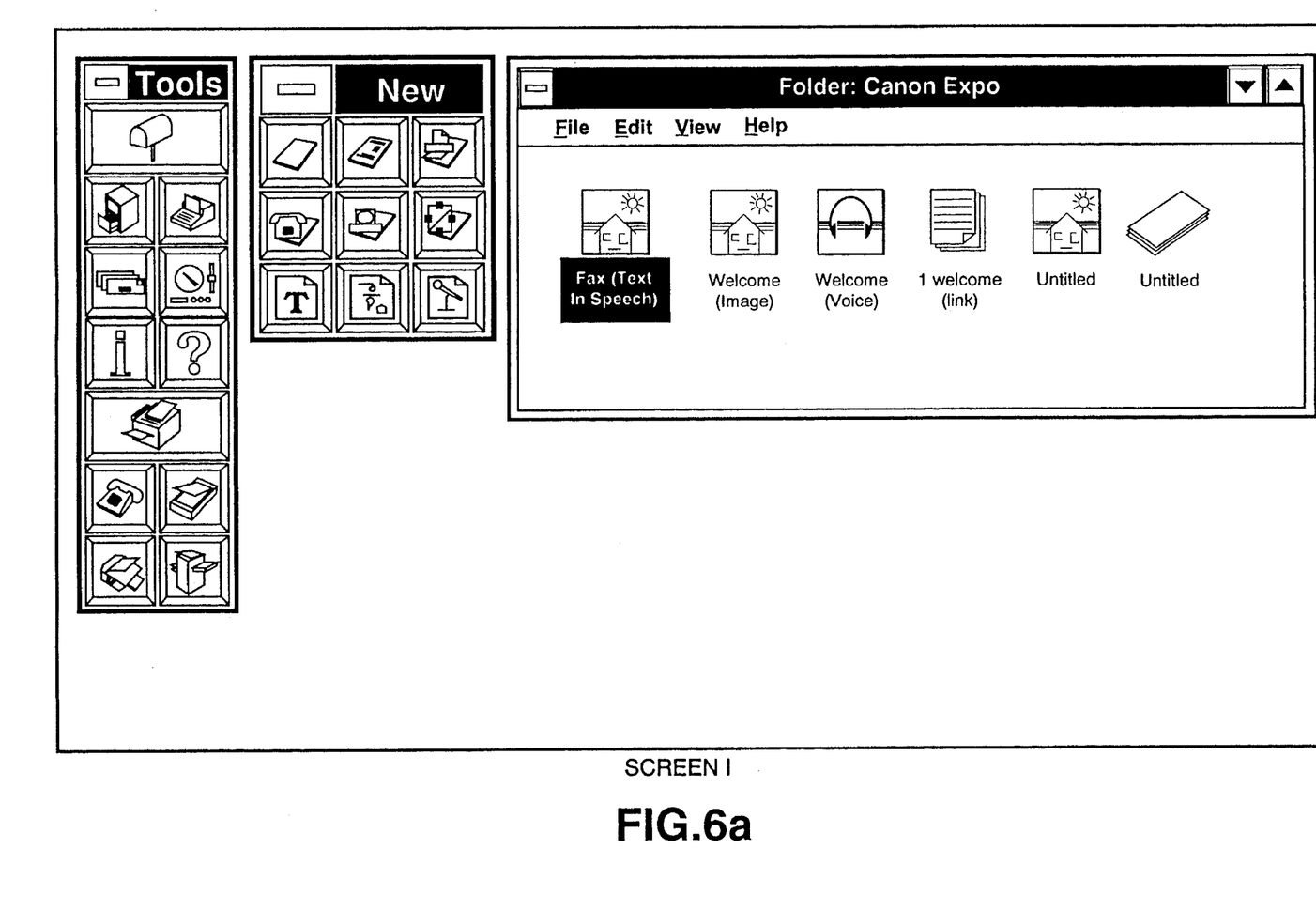
FIG. 6A is a view of Screen 1 for explaining how a window is modified in accordance with context.
Figure 7:
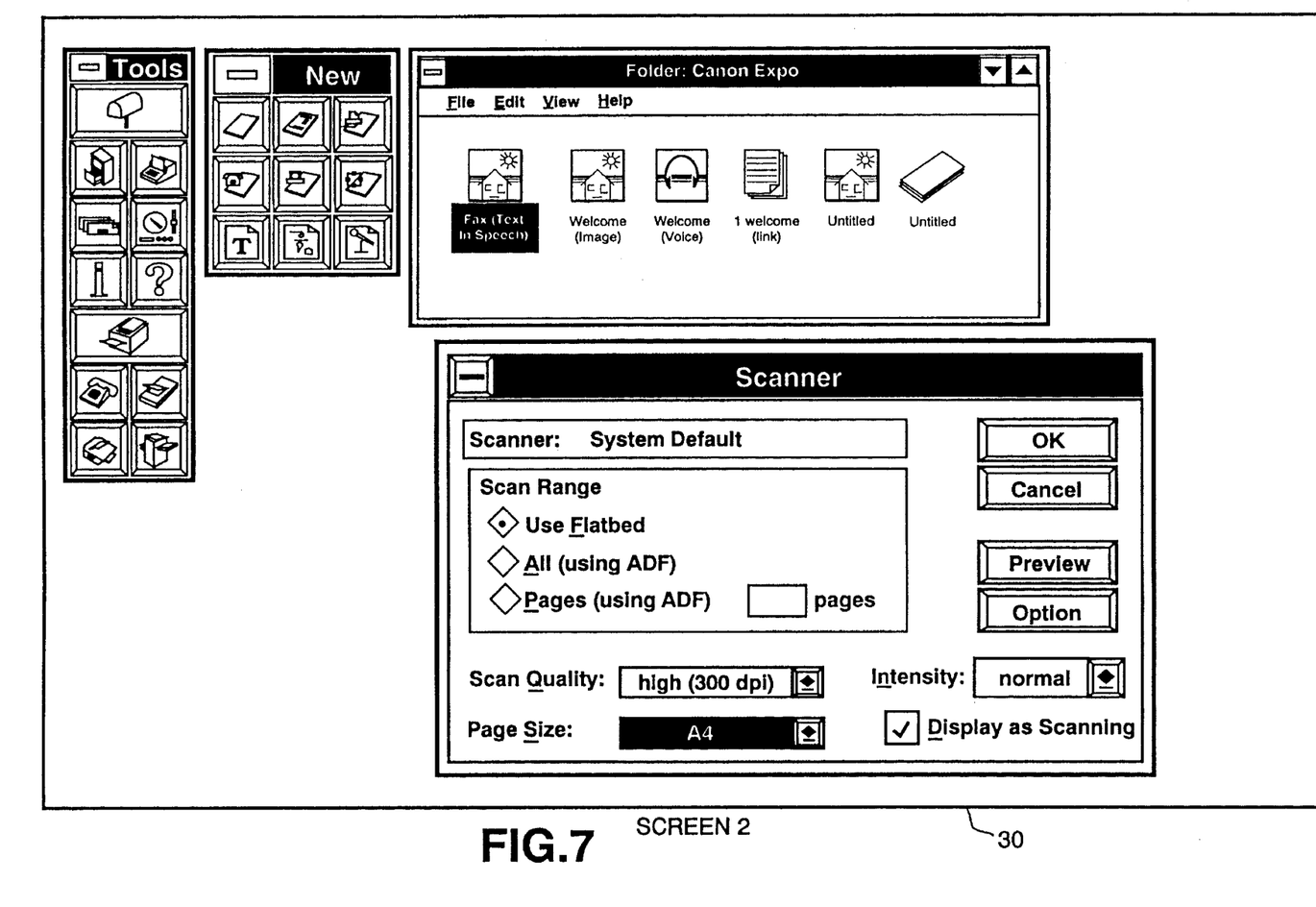
FIG. 7 is a view of Screen 2 for explaining how an editor window is modified in accordance with folder container context.

The operation of the window application will now be explained with reference to FIGS. 6–9. Upon initialization of the window program, static tool palette display 20 or dynamic tool display 22 appear in a default state. As shown in FIG. 6, after selecting a tool to create a container from either tool palette 20 and 22, a container applet such as a folder applet registers its context and database identification with the static tool display palette applet (hereinafter "context manager") 21, dynamic tool display palette editor 22 examines registered context and modifies its display database accordingly. In the case of the folder container, all dynamic tool functions are applicable to the folder context as displayed in Screen 1 of FIG. 6A.

After the folder has been created by the folder applet, an editor function is selected to create data to input into the folder. As illustrated in Screen 2 of FIG. 7, a scanner editor has been selected as depicted by scanner editor window 30. Upon selecting the scanner editor, the scanner applet is downloaded from the file server, stored in RAM, and executed therefrom. Once the scanner applet is executed, the scanner applet examines the currently stored context, determines whether the current context is compatible with its function, and, in the case the context is compatible, the scanner applet modifies its operation to process data in accordance with the folder applet context.

In addition to modifying the operation of the scanner applet, scanner window 30 is also modified either to present further options to be selected or to instruct the user to initiate the scanner. For example, in Screen 2 of FIG. 7, scanner window 30 appears in its most general form with many options for the user to select. As shown in Screen 2, scanner window 30 permits the user to enter features for scanning such as Scan Quality (in dpi), Page Size (letter, A4, etc.), and Intensity Level. There is also provided an OPTION button in scanner window 30 which permits the user to select further option features if desired.

An editor applet changes its operation as well as its window display in accordance with the context of the container applet. As shown in Screen 3 of FIG. 8, the container for holding data has been changed to a fax message container. The scanner applet examines the context registered in context manager 21 and determines that the parameters for a fax message are to be set in accordance with predetermined features. As shown, static tool display palette 20 remains in the same position with the same tools for the convenience of user selection. Once the facsimile message applet registers its context with context manager 21, dynamic tool palette display editor 25 examines the current context and modifies its display database, if necessary. In the present case, dynamic tool display palette 22 is modified from its previous display in FIG. 7 to the display illustrated in FIG. 8.

Figure 8:
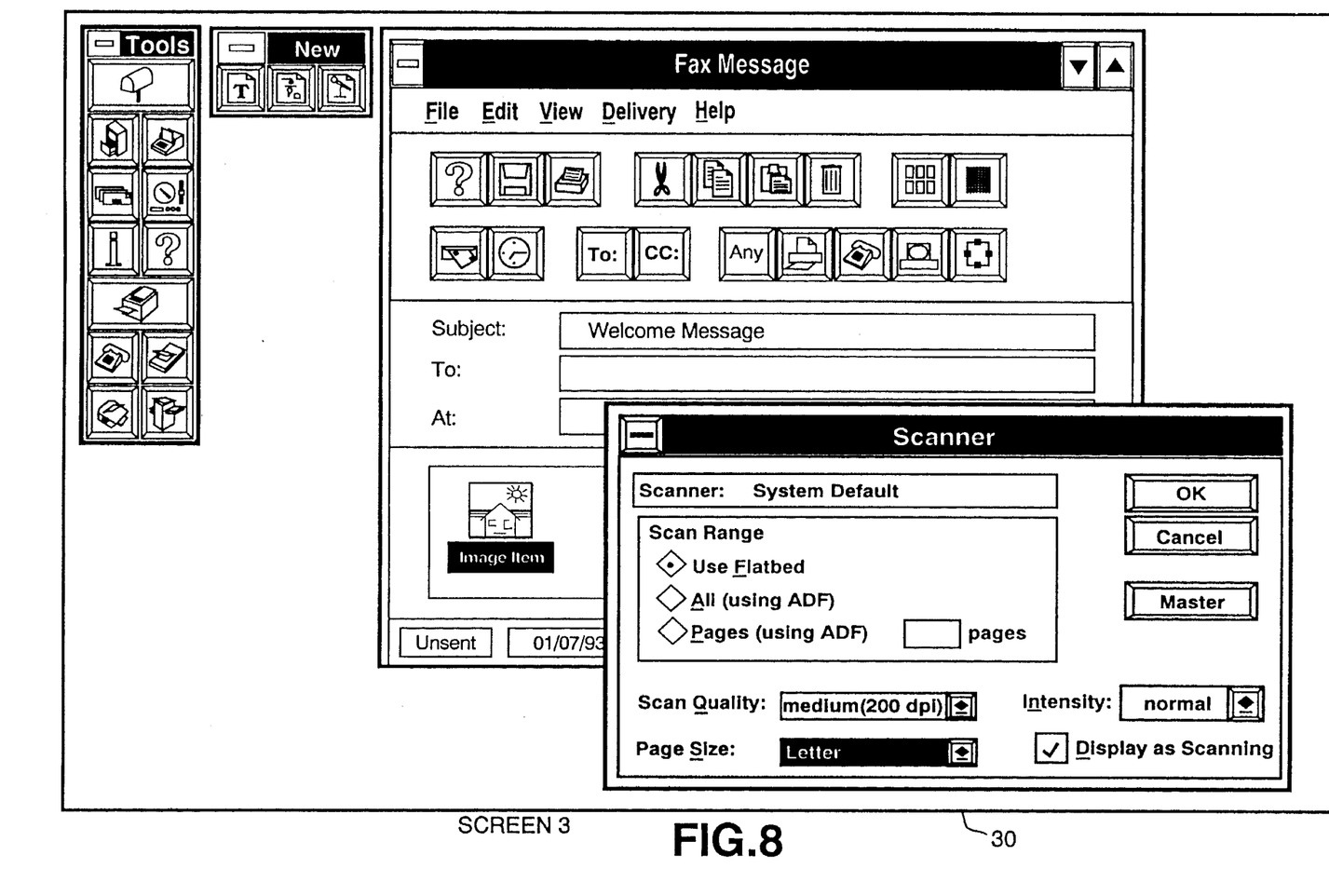
FIG. 8 is a view of Screen 3 for explaining how a scanner window is modified by a fax message container.

After the scanner editor has been selected, the scanner applet examines the current context. Since the current context is a facsimile message, the scanner applet modifies its operation in accordance with predetermined parameters set by the context of the facsimile message. After the scanner applet has modified its operation, the scanner applet presents its scanner editor window without permitting the user to select scanner options.

In the fax message context, scanner window 30 has the appearance as shown in Screen 3. Screen 3 shows that the Scan Quality parameter, the Intensity parameter, and Page Size parameter have been preset. In addition, the OPTION button is removed from scanner window 30. As a result, the user cannot select features for creating the form of the data. Here, the scanner editor applet determines its own operation mode based on previously determined parameters for producing a facsimile message. After completing the scanning operation, the scanning applet downloads the process data into the appropriate container (fax message) in accordance with the stored context.

Figure 9:
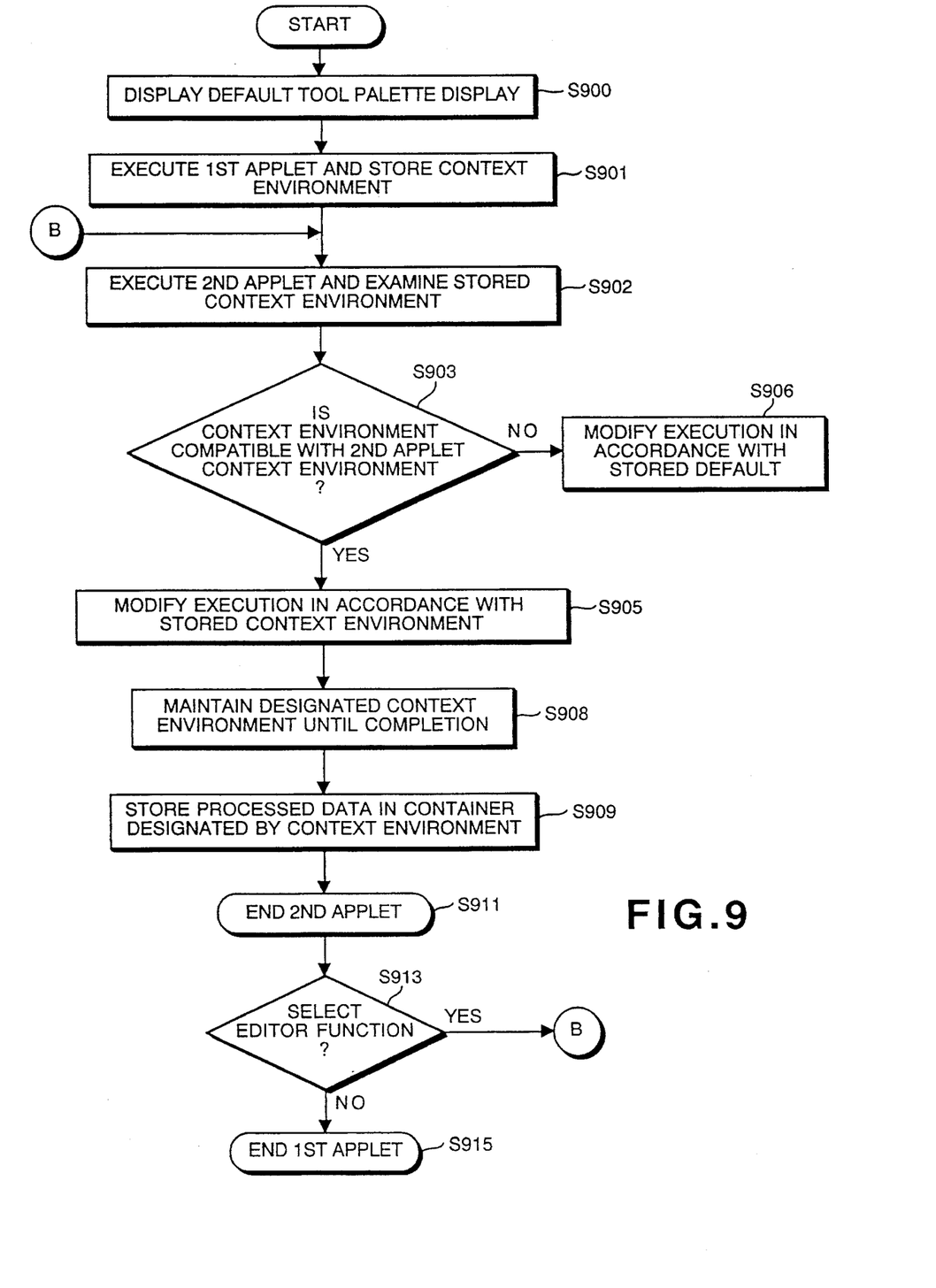
FIG. 9 is a flowchart explaining how a context is designated for an editor applet.

A more detailed discussion of the method of modifying the context of an editor applet will be provided below with reference to the flowchart illustrated in FIG. 9.

Upon initialization of the window application, a default context is recognized and the default tool palette for both the static and dynamic tool palettes are displayed on monitor 2 in step S900. In step S901, a container applet is selected in order to create a container for holding data. Upon selecting a container applet, the container applet is downloaded from the file server and stored in a RAM location for execution. The context of the container applet which contains the container's handle and database identification is registered with context manager 21 in step S902. After the container context has been registered and the container created, an editor applet is selected and executed in step S903. At this point, the editor applet examines the context of the current container which is stored in context manager 21. In step S903, the editor applet determines if the context environment is suitable for its function.

In the case that the context environment is suitable for the function of the editor applet, the editor applet modifies its operation and window display in accordance with the stored context environment in step S905. However, in the case the context environment of the container applet is not compatible, the editor applet operates in accordance with a predetermined stored default context environment in step S906. In step S908, the editor applet maintains the designated context until its processing operation is complete. Once the processing of the editor applet is complete in step S909, the processed data is deposited in the container designated by the context database identification stored in context manager 21. In step S911, the editor applet ends its operation and returns control to the container applet. Finally, in step S913, if it is determined that further editor functions are desired, flow returns to step S902. However, if no further editor functions are desired in step S915, the container applet is closed out and its operation is ended.

(Second Embodiment)

The following is a description of a second embodiment of the present invention in which multiple contexts are set.

As explained above, the container applet registers a single context with context manager 21 which is used by an editor if the context is suitable for the editor function. However, there is a possibility that the editor applet determines that the current context is not compatible with its function, for example, a scanner context for a text-to-speech editor. In this case, an editor applet performs its function in a predetermined default context environment. Since the default context may not be known by the user, the operation of the program may become confusing. Accordingly, the present embodiment allows an editor to operate in a previously registered context which is suitable for its operation. In this embodiment, the container applet can set a multiple context for all editor applets.

Figure 10:
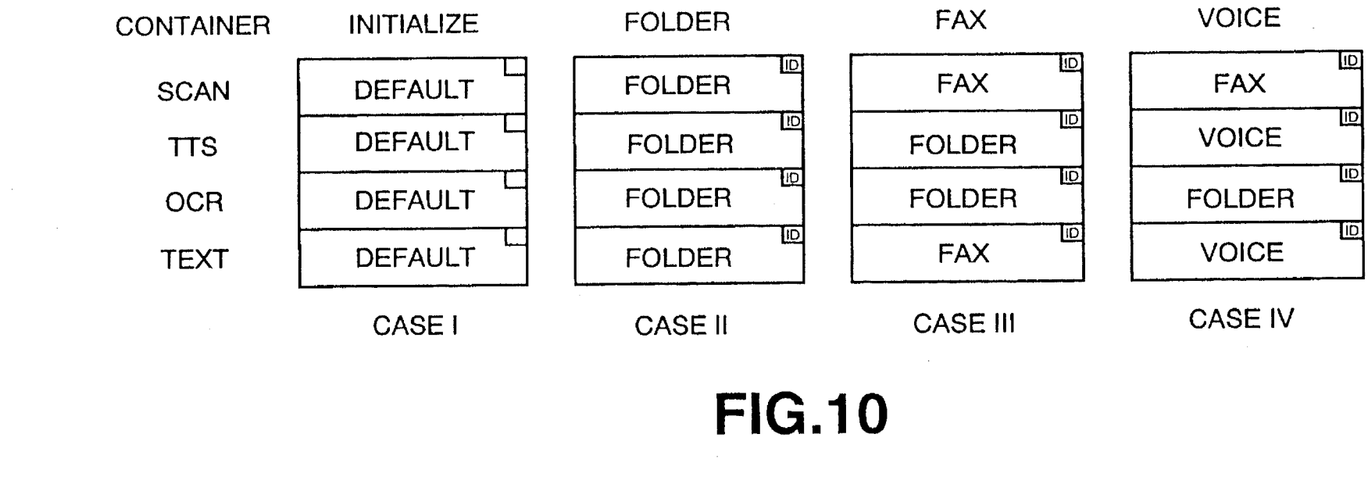
FIG. 10 is a chart for explaining the multi-context embodiment.

The operation of the second embodiment will be addressed in more detail with reference to FIG. 10.

Upon initialization of the window application of the present invention, a context is not stored within context manager 21, therefore, the context is set to a default context. In the multiple context embodiment, a multiple location context is provided for each of the editors in context manager 21. For example, as illustrated in FIG. 10, Case 1 represents the initialization process of the window application. In Case 1, the contexts of the scanner editor, the text-to-speech editor, the OCR editor, and the text editor are set to a default context.

In the present example illustrated in Case 1, if the scanner editor is selected prior to selecting a container, the scanner applet is executed in a default context. That is, the scanner applet will first determine if the present database identification is valid and if the context is suitable for its function. However, in the case of initialization, the scanner applet will not locate a valid identification and, consequently, the scanner editor will function in accordance with a predetermined default environment. The remaining editors, namely, text editor, OCR editor, and text-to-speech editor, if selected upon initialization, operate in the same manner as discussed above for the scanner editor.

In Case 2, a folder container is selected after initialization. The folder applet registers its context as well as its database identification in the multiple context locations of context manager 21. Since the folder context is suitable for all editors operating in the system, the context will be registered with each editor context location. In this manner, each editor can operate within the folder context, and upon completing their function, the editor can deposit the data into a database which has been designated by the identification stored in the context.

Remaining cases 3 and 4 of FIG. 10 illustrate the situation in which the context of a container is not suitable for all editors. In these cases, the editor will utilize the last relevant context for its operation along with its database for depositing data. For example, in Case 3, after the folder window is closed, its context remains stored in context manager 21. Upon selecting a fax message container, the fax message applet overwrites its context into all of the relevant editor locations within context manager 21. As shown in Case 3, the fax message context is relevant for all editors with the exception of the text-to-speech editor and OCR editor. Accordingly, the last relevant context which, in this case, was the folder context will remain as the context of both the text-to-speech editor and the OCR editor.

Similarly, in Case 4, once the fax message window has been closed out, its context will remain registered with context manager 21. But upon selecting the voice message, the voice message applet overwrites its context into the appropriate editor context locations of context manager 21. In Case 4, the voice message context is applicable to the text editor and the text-to-speech editor. However, in the case of the scanner editor, the last suitable context was the fax message context which remains as its context. In addition, the voice message context is also unsuitable for the OCR editor and, accordingly, the OCR editor remains in the last context suitable which is the folder context.

By virtue of the foregoing, multiple context settings provide suitable environments for each editor even if the current context is unsuitable for the currently selected editor. As a result, the editor does not have to function in a default state thereby causing ambiguity for the user.

In the foregoing embodiment, dynamic tool palette display applet 24 operates in a similar manner as described in the first embodiment. That is, dynamic tool palette display 22 is modified in accordance with current context.

(Third Embodiment)

The following is a description of a third embodiment of the present invention in which editor applets are chained or bound together so as to create a "super-editor". In this manner, the current context is passed from one editor to the next editor within the chain as a parameter. As a result, even if a context is not suitable for the first editor function within the chain, that editor can still operate appropriately since the context need only be suitable for the last editor in the chain. That is, the type of data created must be in the context of the container.

Figure 11:
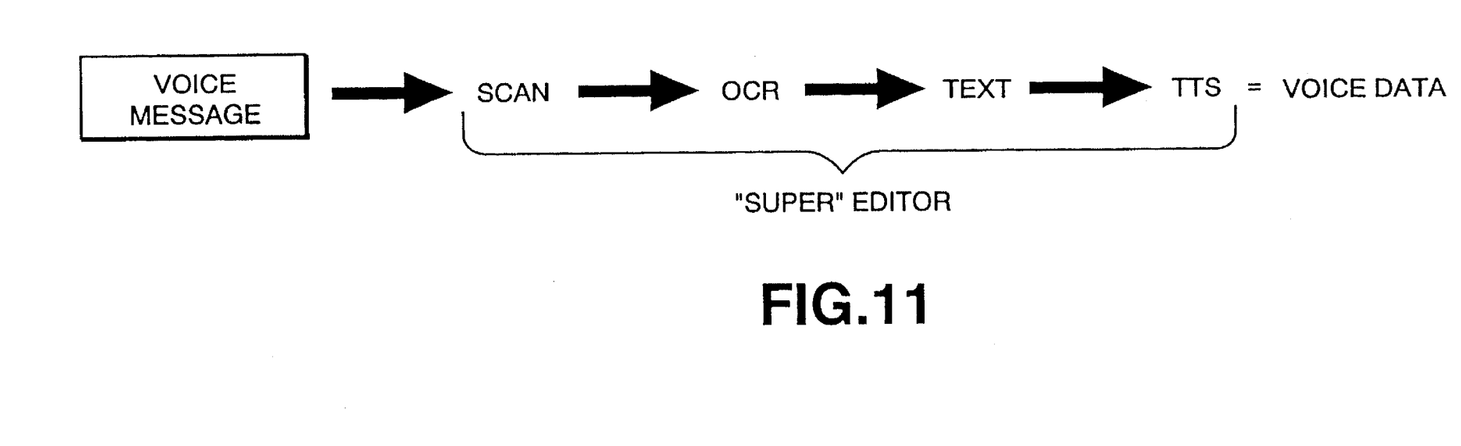
FIG. 11 is a representation of the super-editor embodiment.

As illustrated in FIG. 11, a voice message is registered as the current context. In this example, the super-editor comprises a scanner editor, an OCR editor, a text editor, and a text-to-speech editor. Unlike the previous embodiments, the present embodiment permits the initial editors (scanner, OCR, and text) to operate in a context which is not suitable for processing data in accordance with its editor function. However, the overall super-editor determines whether the current context is suitable for processing the function of an editor which finishes the processing of the data.

In the present example, as shown in FIG. 11, the text-to-speech editor is the final editor to process the data in the voice context. As a result, the process data can be processed according to the voice message context.

In the case of the super-editor, the dynamic tool palette 22 operates in primarily the same way as discussed above with reference to the first embodiment of the invention. That is, the dynamic tool palette applet 24 examines the current context, in this case the voice context, and modifies its display in accordance with that context.

What is claimed is:

1. A method for displaying a static tool palette having predefined windowing tool functions and a dynamic tool palette having windowing tool functions, the function and number of windowing tool functions in the dynamic tool palette being determined in accordance with a currently-executing application program, the method comprising the steps of:

launching an application program from within the currently-executing application program, the application program including a static tool palette having predefined windowing functions;

specifying a context environment of the currently-executing application program;

examining the specified context environment of the currently-executing application program;

determining applicable windowing tool functions for the launched application program in accordance with the examined context environment; and displaying the static tool palette having the predefined windowing tool functions and displaying, during execution of the launched application program, the dynamic tool palette which includes the applicable windowing tool functions determined in the determining step, wherein the static tool palette is displayed simultaneously with, and separately from, the dynamic tool palette.

2. The method according to claim 1, wherein the step of specifying includes the step of storing the context environment in a designated location, and wherein the step of examining includes examining the stored context environment to determine the applicable windowing tool functions to be included in the dynamic tool palette.

3. The method according to claim 1, wherein the launching step launches an application program to create a container to store data.

4. The method according to claim 3, wherein the specifying step specifies a window identification and a database identification of the container corresponding to the application program being launched in the launching step.

5. The method according to claim 4, further comprising the step of modifying a database of the dynamic tool palette windowing function by selecting from a predetermined selection of windowing tool functions in accordance with the specified window currently being executed in the application program.

6. The method according to claim 3, wherein the step of determining includes the step of designating default windowing tool functions for the dynamic tool palette in the case that the currently-executing application program does not specify a context environment.

7. An apparatus for simultaneously displaying a static tool palette having predefined windowing tool functions and a dynamic tool palette having windowing tool functions, the function and number of windowing tool functions in the dynamic tool palette being determined in accordance with a currently-executing application program, the apparatus comprising:

memory means for storing a plurality of integrated application programs;

selection means for selecting one of the plurality of integrated application programs stored in the memory means, the selected integrated application program including a static tool palette having predefined windowing tool functions;

processing means for processing the selected integrated application program, wherein the processing means performs the steps of 1) launching the selected integrated application program from within the currently-executing application program, 2) specifying a context of the currently-executing application program, 3) examining the specified context, and (4) determining applicable windowing tool functions for the selected integrated application program in accordance with the examined context; and display means for displaying a static tool palette having predefined windowing tool functions and for displaying, during execution of the selected integrated application program, a dynamic tool palette which includes the applicable windowing tool functions determined by the processing means, wherein the static tool palette is displayed simultaneously with, and separately from, the dynamic tool palette.

8. An apparatus according to claim 7, wherein the memory means stores the context in a designated location, and wherein the processing means compares the stored context to windowing tool functions of predetermined contexts stored in a memory and modifies the dynamic tool palette in accordance with a result of the comparison.

9. In an apparatus which includes a first static tool palette having predetermined and unalterable windowing functions and a second dynamic tool palette having modifiable windowing tool functions, a method for determining and displaying the second dynamic tool palette in accordance with a current context of a currently-executing application, the method comprising the steps of:

launching an application from within the currently-executing application;

registering a context of the currently-executing application in a context memory;

examining the registered context;

determining applicable windowing tool functions associated with the registered context; and displaying the first static tool palette, and displaying the second dynamic tool palette during execution of the application program, the second dynamic tool palette being displayed with the applicable windowing tool functions associated with the registered context.

10. The method according to claim 9, further comprising the step of displaying the first static tool palette simultaneously with, and separately from, the modified second dynamic tool palette.

11. An apparatus for altering a dynamic tool palette having windowing tool functions which change in accordance with a current context of a currently-executing application, comprising:

launching means for launching an application from within the currently-executing application;

context memory means for storing a context of the currently-executing application program;

registering means for registering the context of the currently-executing application program in the context memory means;

examining means for examining the registered context;

determining means for determining applicable windowing tool functions associated with the registered context; and display means for displaying the dynamic tool palette including the applicable windowing tool functions, said display means displaying the dynamic tool palette during execution of the application program.

12. The apparatus according to claim 11, further comprising a static tool palette having predefined and unmodifiable windowing tool functions, wherein the static tool palette is displayed simultaneously with, and separately from, the dynamic tool palette.

13. A method for displaying a static tool palette and a dynamic tool palette by which execution of first and second application programs may be initiated, comprising the steps of:

displaying a static tool palette having predefined windowing tool functions;

launching the first application program from the static tool palette and displaying a first dynamic tool palette which is separate from the static tool palette and which includes windowing tool functions which are appropriate for the functionality of the first application program; and launching the second application program from within the first application program and modifying the first dynamic tool palette to include only windowing tool functions which are appropriate for the functionality of the second application program;

wherein the appearance and position of the static tool palette is the same regardless of whether the first or the second application program is executing.

14. A method according to claim 13, wherein the static tool palette includes a plurality of icons, all of which are active regardless of whether the first or the second application program is executing.

15. The method according to claim 13, wherein the first dynamic tool palette includes a plurality of icons, all of which are active only during execution of the first application program.

16. A method according to claim 15, wherein the second dynamic tool palette includes a plurality of icons, all of which are active only during execution of the second application program.

* * * * *

UNITED STATES PATENT AND TRADEMARK OFFICE
CERTIFICATE OF CORRECTION

PATENT NO. : 5,572,648

DATED : November 5, 1996

INVENTOR(S) : Farzad Bibayan

It is certified that error appears in the above-identified patent and that said Letters Patent is hereby corrected as shown below:

COVER PAGE

Under [54] Title, "FUNCTONS" should read --FUNCTIONS--.

COLUMN 1

Line 6, "FUNCTONS" should read --FUNCTIONS--.

Signed and Sealed this

Twenty-fifth Day of March, 1997

Attest:

BRUCE LEHMAN

Attesting Officer     Commissioner of Patents and Trademarks